United States Patent
Watanabe (10) Patent No.: US 10,527,154 B2
(45) Date of Patent: Jan. 7, 2020

(54) PLANETARY ROLLER POWER TRANSMISSION DEVICE

(71) Applicant: JTEKT CORPORATION, Osaka-shi, Osaka (JP)

(72) Inventor: Hajime Watanabe, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/976,239

(22) Filed: May 10, 2018

(65) Prior Publication Data

US 2018/0335126 A1  Nov. 22, 2018

(30) Foreign Application Priority Data

May 18, 2017 (JP) .................................. 2017-098908

(51) Int. Cl.
*F16H 13/08* (2006.01)
*F16H 57/04* (2010.01)

(52) U.S. Cl.
CPC ......... *F16H 57/0431* (2013.01); *F16H 13/08* (2013.01); *F16H 57/0464* (2013.01); *F16H 57/0486* (2013.01); *F16H 57/0487* (2013.01); *F16H 2700/00* (2013.01)

(58) Field of Classification Search
CPC ... F16H 13/08; F16H 57/0487; F16H 57/0486
See application file for complete search history.

(56) References Cited

U.S. PATENT DOCUMENTS

| | | | |
|---|---|---|---|
| 10,041,581 B2* | 8/2018 | Watanabe | ........... F16H 57/0486 |
| 2016/0348760 A1* | 12/2016 | Wigsten | ................ F16H 1/2863 |
| 2017/0009873 A1 | 1/2017 | Watanabe | |

FOREIGN PATENT DOCUMENTS

JP           2017-015231 A     1/2017

* cited by examiner

*Primary Examiner* — Derek D Knight
(74) *Attorney, Agent, or Firm* — Oliff PLC (57) ABSTRACT

A planetary roller power transmission device includes: a stationary ring; a sun shaft disposed radially inside the stationary ring so as to be concentric with an axis of the stationary ring; planetary rollers provided between the stationary ring and the sun shaft so as to be pressed against them; a carrier that rotatably supports the respective planetary rollers and rotates in conjunction with revolution of the planetary rollers; an oil-containing roller configured to be in contact with a peripheral surface of each planetary roller; and a support body having a support shaft that is formed to protrude toward one side in an axial direction of the stationary ring in a cantilevered manner and rotatably supports the oil-containing roller. An axis of the support shaft is inclined such that a distal end of the support shaft is closer to the axis of the stationary ring than a base end thereof.

3 Claims, 7 Drawing Sheets

PLANETARY ROLLER POWER TRANSMISSION DEVICE

INCORPORATION BY REFERENCE

The disclosure of Japanese Patent Application No. 2017-098908 filed on May 18, 2017 including the specification, drawings and abstract, is incorporated herein by reference in its entirety.

BACKGROUND OF THE INVENTION

1. Field of the Invention

The invention relates to a planetary roller power transmission device. More specifically, the present invention relates to a planetary roller power transmission device that uses an oil-containing roller to lubricate the interior of the device.

2. Description of Related Art

Planetary roller power transmission devices can transmit power of a motor with high precision because rotational speed thereof is more uniform than that of planetary-gear-type power transmission devices. Thus, the planetary roller power transmission devices have been conventionally used for a paper feeding mechanism of printers, for example. In such a planetary roller power transmission device, power is sequentially transmitted by friction among a sun shaft, planetary rollers, and a stationary ring that are made of metal. As lubricant for preventing seizure of members due to friction between metals, grease is commonly used.

However, after a device has been used for a certain period, grease may leak from the device, whereby the grease may be depleted. If grease depletes, friction between metals is generated, which causes seizure that reduces the lifespan of the device. In view of this, it is proposed that an oil-containing roller formed by mixing synthetic resin powder with oil and baking the resulting mixture in a roller shape is used with grease to increase the lifespan of a device (see Japanese Patent Application Publication No. 2017-15231 (JP 2017-15231 A), for example).

Figure 7:
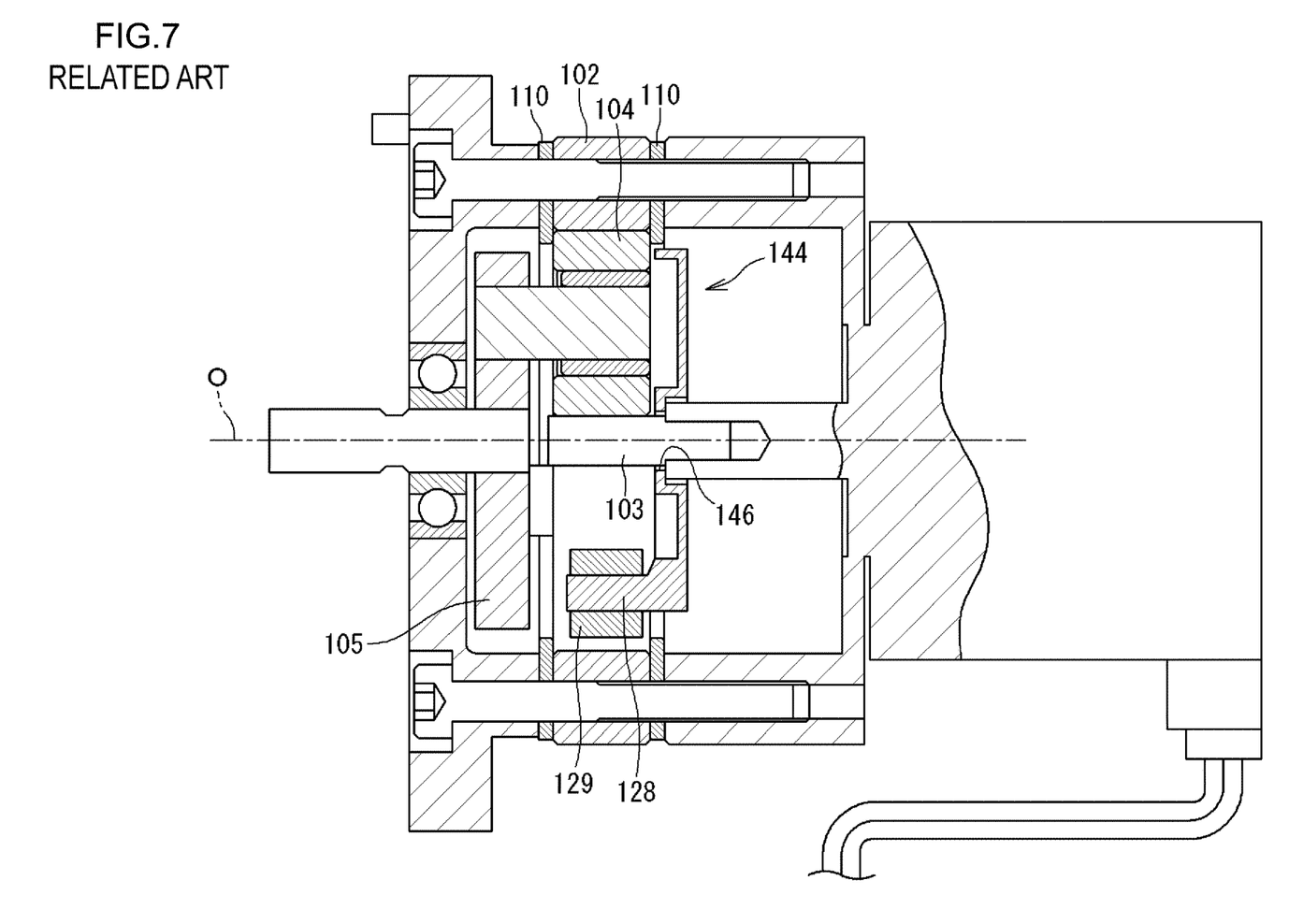
FIG. 7 is a vertical sectional view of a planetary roller power transmission device according to a related art.

As depicted in FIG. 7, for example, a planetary roller power transmission device described in JP 2017-15231 A includes an annular stationary ring 102, a sun shaft 103, and a plurality of planetary rollers 104. The sun shaft 103 is disposed concentrically with the stationary ring 102. The planetary rollers 104 are rotatably supported by a carrier 105, and revolve about the axis of the stationary ring 102 while rotating on an inner peripheral surface of the stationary ring 102. Onto both surfaces of the stationary ring 102 in the axial direction, loose ribs 110 for guiding the planetary rollers 104 are attached. Oil-containing rollers 129 are each disposed between the planetary rollers 104, and are supported by a support plate 144 so as to be able to revolve about the sun shaft 103. The support plate 144 has a plurality of support shafts 128 that protrude toward one side in the axial direction in a cantilevered manner and are spaced apart from each other in the circumferential direction. To each support shaft 128, the corresponding oil-containing roller 129 is rotatably attached. In the center of the support plate 144, a central hole 146 is formed, into which the sun shaft 103 is inserted with a predetermined clearance therebetween.

The sun shaft 103 is inserted into the central hole 146 of the support plate 144 with the predetermined clearance therebetween. Thus, there are occasions when the support plate 144 is inclined with respect to an axis O within the range of this clearance. In such occasions, in one side portion of the support plate 144 in the radial direction, the corresponding support shaft 128 is inclined such that the distal end side of the support shaft 128 tilts radially outward. Due to this inclination and contact of the corresponding oil-containing roller 129 with the corresponding planetary roller 104, a force acts on the oil-containing roller 129 in a direction detaching from the support shaft 128. In addition, due to centrifugal force associated with the rotation of the support plate 144, a force acts on the oil-containing roller 129 in the direction detaching from the support shaft 128. If the oil-containing roller 129 moves in the direction detaching from the support shaft 128, the oil-containing roller 129 may come into contact with an inner periphery of a loose rib 110, or may be caught between the loose rib 110 and the planetary roller 104. This may result in an increase of rotational resistance of the carrier 105.

SUMMARY OF THE INVENTION

An object of the present invention is to provide a planetary roller power transmission device that can prevent oil-containing rollers from being detached from support shafts.

A planetary roller power transmission device according to one aspect of the present invention includes: a stationary ring; a sun shaft disposed radially inside the stationary ring so as to be concentric with an axis of the stationary ring; a plurality of planetary rollers provided between the stationary ring and the sun shaft so as to be pressed against the stationary ring and the sun shaft; a carrier that supports the planetary rollers so that the planetary rollers are rotatable and that rotates in conjunction with the revolution of the planetary rollers; an oil-containing roller configured to be in contact with an outer peripheral surface of each of the planetary rollers; and a support body having a support shaft that is formed to protrude toward one side in an axial direction of the stationary ring in a cantilevered manner and rotatably supports the oil-containing roller. An axis of the support shaft is inclined such that a distal end side of the support shaft is closer to the axis of the stationary ring than a base end side of the support shaft.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the present invention will now be described in detail with reference to the accompanying drawings. It should be noted that the present invention is not limited to these examples, and is described by the claims and is intended to include all modifications within the spirit and the scope equivalent to the claims.

Figure 1:
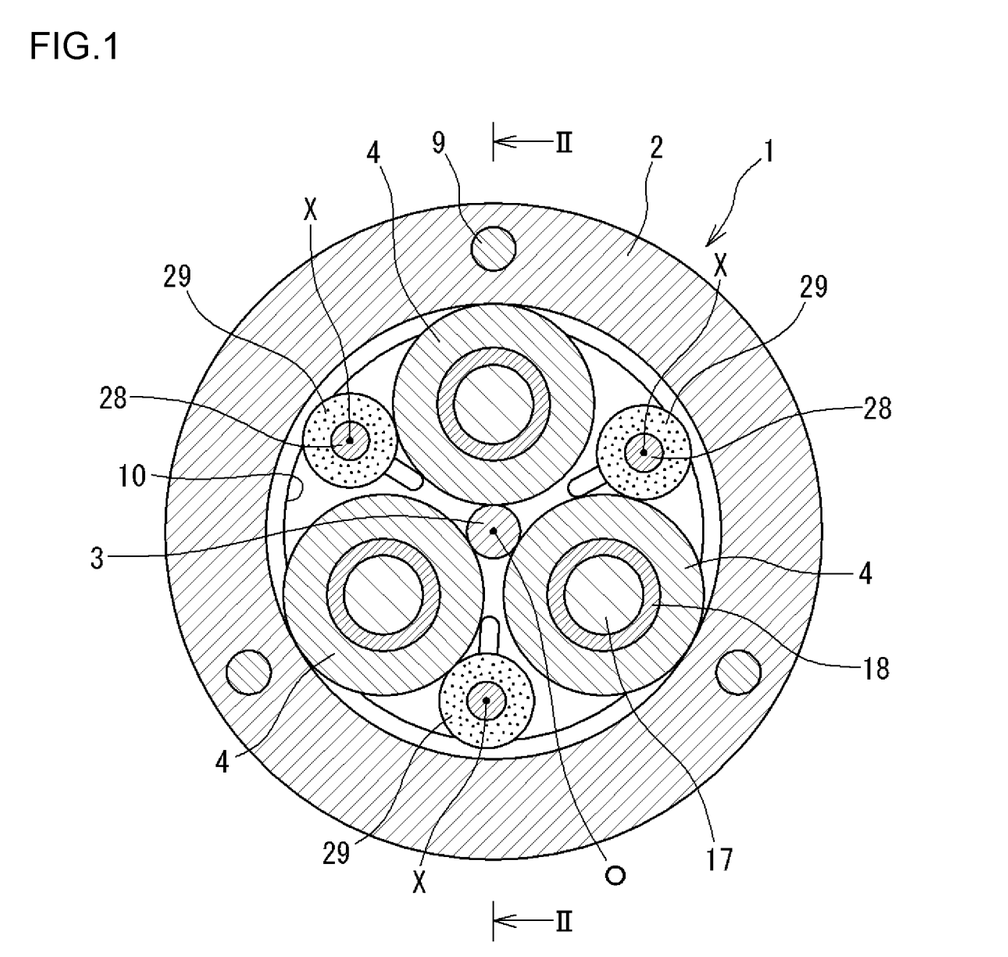
FIG. 1 is a cross-sectional view of a planetary roller power transmission device according to one embodiment of the present invention.
Figure 2:
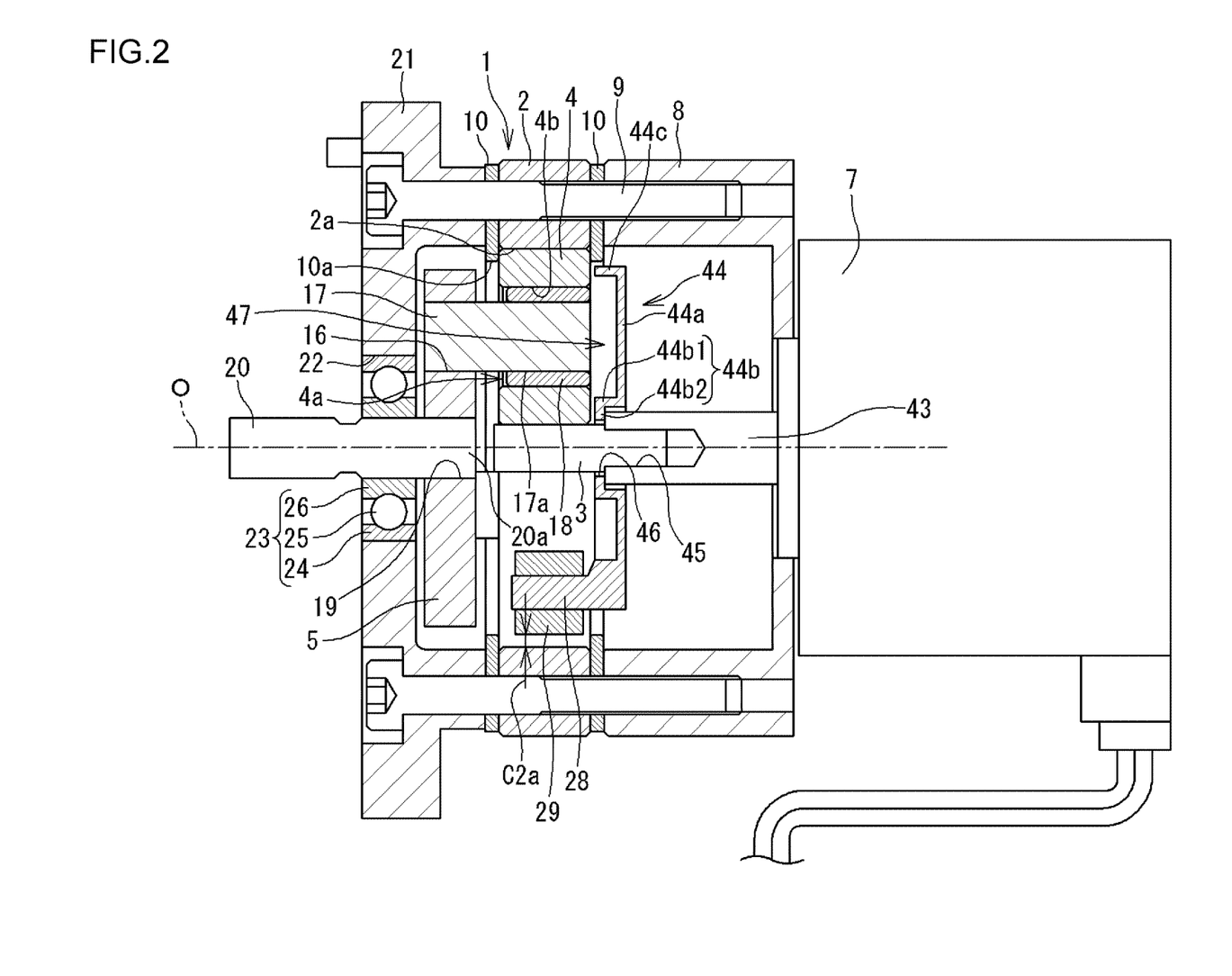
FIG. 2 is a sectional view taken along line II-II in FIG. 1.

FIG. 1 is a cross-sectional view of a planetary roller power transmission device according to one embodiment of the present invention. FIG. 2 is a sectional view taken along line II-II in FIG. 1. This planetary roller power transmission device 1 is a device that reduces a speed of rotation output from a motor so as to output the resulting rotational speed. The planetary roller power transmission device 1 includes a stationary ring 2, a sun shaft 3, a plurality of planetary rollers 4, a carrier 5, a support plate (support body) 44, and oil-containing rollers 29.

The stationary ring 2 is fixed by bolts 9 to a bracket 8 formed on a housing 7 of the motor. The bracket 8 has a cylindrical shape open to one end, in which the sun shaft 3 and the support plate 44 are disposed. On both sides of the stationary ring 2 in the axial direction, loose ribs 10 for guiding the planetary rollers 4 are each disposed. An inner peripheral surface 10a of each loose rib 10 slightly protrudes radially inward of an inner peripheral surface 2a of the stationary ring 2 so as to restrict axial movement of the planetary rollers 4 that rotate and revolve. The loose ribs 10 are fixed to the bracket 8 together with the stationary ring 2 by the bolts 9. The stationary ring 2 can be made of metal such as high carbon-chromium bearing steel. The loose ribs 10 can be made of metal such as tool steel.

The sun shaft 3 is disposed concentrically with an axis O of the stationary ring 2. Thus, the sun shaft 3 has the same axis O as the stationary ring 2. The sun shaft 3 is directly fixed to a motor shaft 43 protruding from the housing 7 by press-fitting. Specifically, the sun shaft 3 is press-fitted into a hole 45 formed in the motor shaft 43. Thus, the sun shaft 3 rotates in synchronization with the rotation of the motor shaft 43.

The planetary rollers 4 are disposed between the stationary ring 2 and the sun shaft 3 so as to be pressed against the stationary ring 2 and the sun shaft 3. In the present embodiment, as depicted in FIG. 1, three planetary rollers 4 are disposed at regular intervals in the circumferential direction. The planetary rollers 4 can be made of metal such as high carbon-chromium bearing steel.

As depicted in FIG. 2, the carrier 5 is disposed on one side (left side in FIG. 2) of the planetary rollers 4 in the axial direction, which is opposite from the motor. The carrier 5 has a disk shape, and roller shafts 17 are press-fitted into peripheral holes 16 formed on outer peripheral portions of the carrier. Each roller shaft 17 has a cylindrical shape, and is press-fitted into the corresponding peripheral hole 16 such that part of the roller shaft 17 protrudes in the axial direction. A distal end portion of each roller shaft 17, that is, an end portion thereof protruding in the axial direction is inserted into a hole 4a of the corresponding planetary roller 4 via a plain bearing 18. The plain bearing 18 is disposed between an inner peripheral surface 4b of each planetary roller 4 and an outer peripheral surface 17a of the corresponding roller shaft 17. Into a central hole 19 of the carrier 5, one end portion 20a of an output shaft 20 is press-fitted.

An opening of the bracket 8 is closed by a disk-shaped cover 21. The cover 21 is fixed to the bracket 8 together with the stationary ring 2 and the loose ribs 10 by the bolts 9. A ball bearing 23 is fitted in a central hole 22 of the cover 21. An outer ring 24 of the ball bearing 23 is press-fitted into the central hole 22 of the cover 21. The output shaft 20 is press-fitted in an inner ring 26 provided inside the outer ring 24 with balls 25 interposed therebetween.

Figure 3:
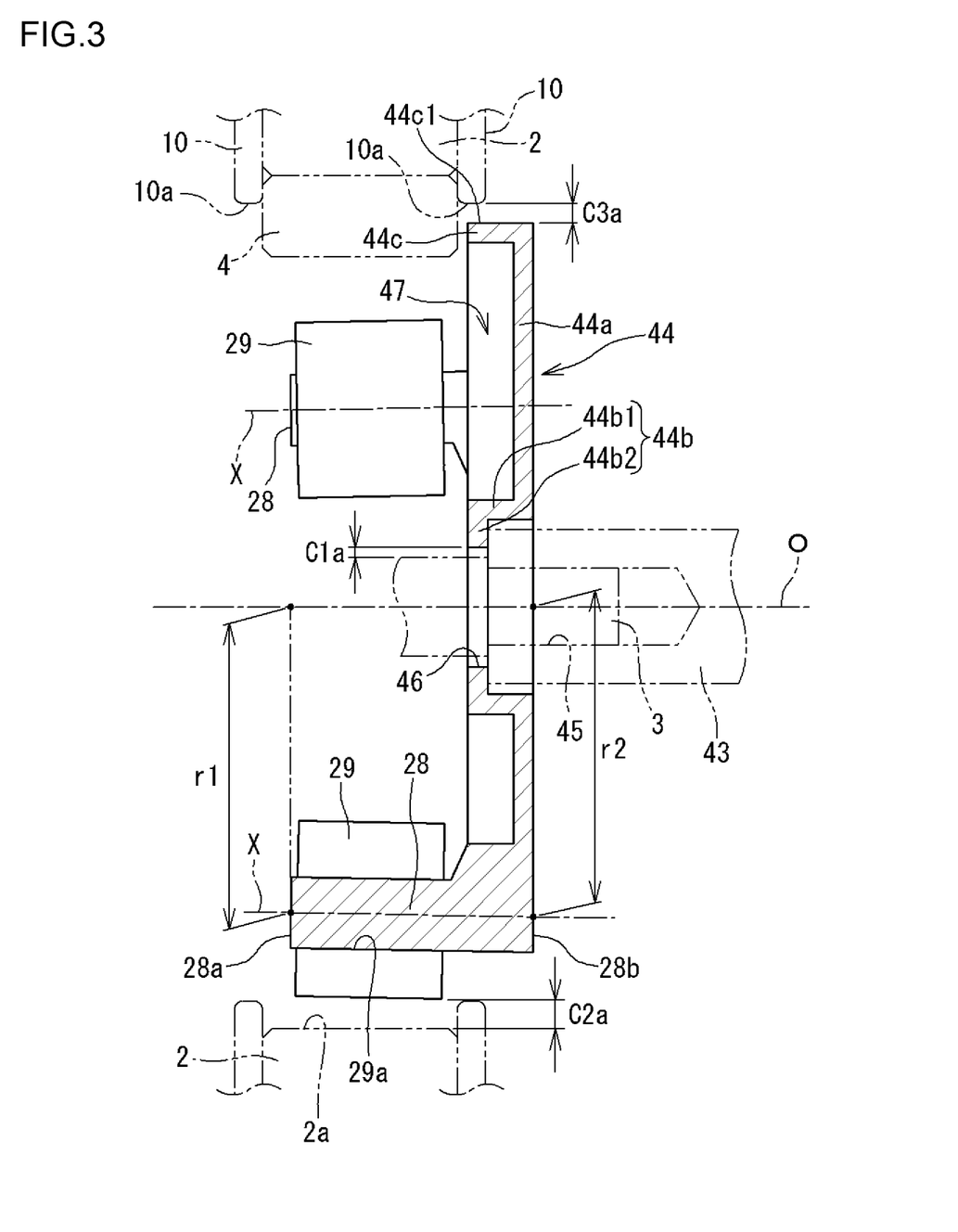
FIG. 3 is a vertical sectional view of a support plate to which oil-containing rollers are provided.
Figure 4:
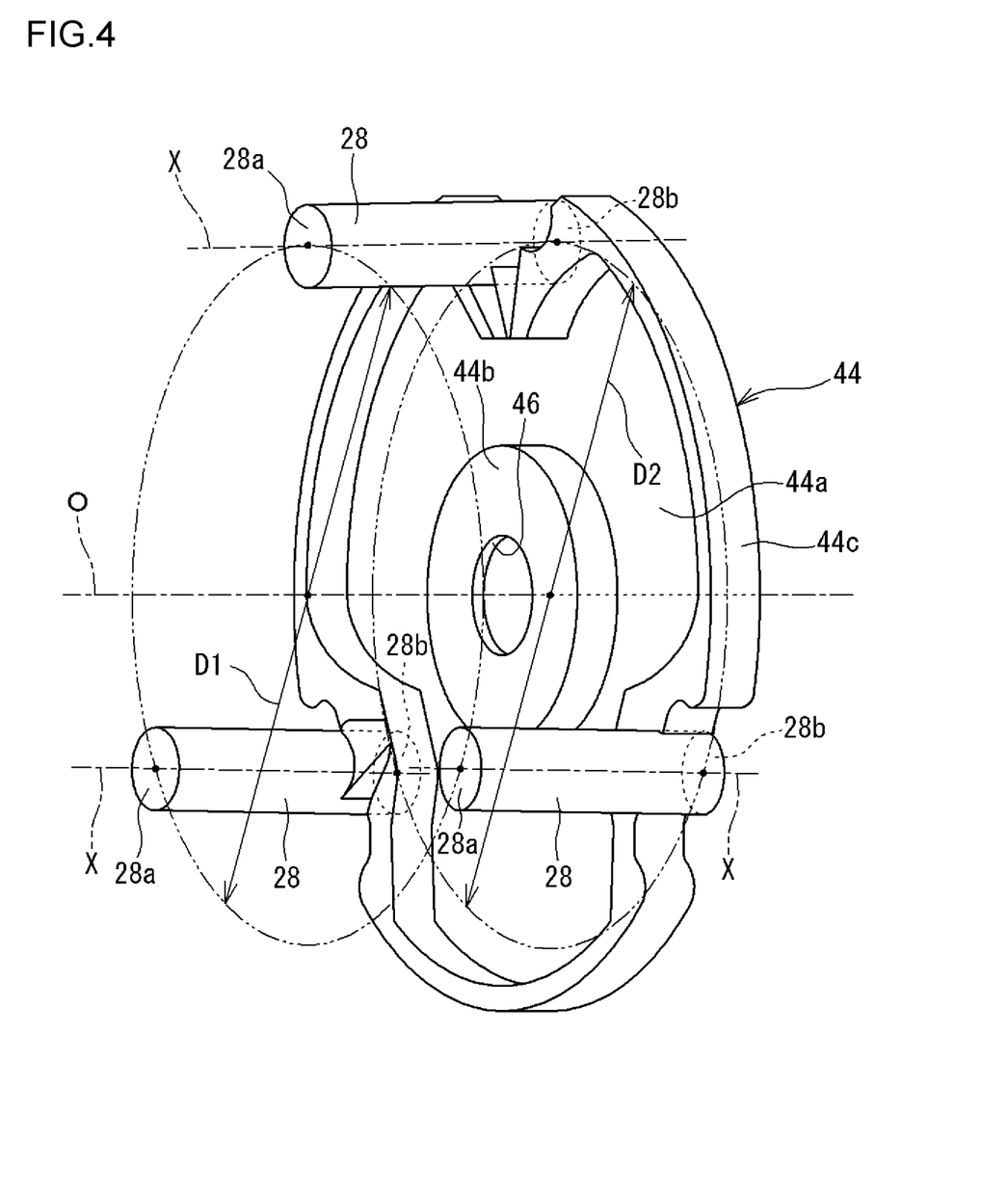
FIG. 4 is a perspective view of the support plate.

FIG. 3 is a vertical sectional view of the support plate 44 to which the oil-containing rollers 29 are provided. FIG. 4 is a perspective view of the support plate 44. The support plate 44 is disposed on the motor side (right side in FIG. 2) of the planetary rollers 4. The support plate 44 has a main body 44a, a projecting portion 44b, and an annular protruding wall 44c. The projecting portion 44b is formed in the center of the main body 44a. The protruding wall 44c protrudes from an outer periphery of the main body 44a toward one side (left side in FIG. 3) in the axial direction. The projecting portion 44b has a short cylindrical side wall 44b1 and a disk-shaped ceiling wall 44b2. In the center of the ceiling wall 44b2, a central hole 46 into which the sun shaft 3 can be inserted is formed.

On the outer peripheral portions of the support plate 44, support shafts 28 are formed that protrude toward the one side (left side in FIG. 3) in the axial direction in a cantilevered manner. The oil-containing rollers 29 are rotatably supported by the support shafts 28. The support shafts 28 in the present embodiment are formed integrally with the main body 44a and the protruding wall 44c of the support plate 44. Alternatively, support shafts 28 that are separated from the main body 44a and the protruding wall 44c of the support plate 44 may be fixed to the main body 44a and the protruding wall 44c.

As depicted in FIG. 3, the protruding wall 44c can form a grease sump 47 on a side surface of the support plate 44 closer to the planetary roller 4. By providing this grease sump 47, grease can be retained in the device. Grease sticking to the grease sump 47 can be returned to the planetary rollers 4. Consequently, rolling contact surfaces between the planetary rollers 4 and the stationary ring 2 can be lubricated for a long period, and the lifespan of the power transmission device 1 can be prevented from decreasing.

Between a peripheral edge of the central hole 46 of the support plate 44 and an outer peripheral surface of the sun shaft 3, a predetermined first clearance C1a is formed. Between an outer peripheral surface 44c1 of the protruding wall 44c of the support plate 44 and the inner peripheral surface 10a of one of the loose ribs 10, a predetermined third clearance C3a is formed. The third clearance C3a is set to be larger than the first clearance C1a. This setting can prevent the support plate 44 from coming into contact with the loose rib 10 and generating abnormal noise, for example, during driving operation.

The first clearance C1a is set to be equal to or smaller than a predetermined second clearance C2a between the inner peripheral surface 2a of the stationary ring 2 and an outer peripheral surface of each oil-containing roller 29. Thus, even if misalignment has occurred during assembly of the device, the peripheral edge of the central hole 46 of the support plate 44 comes into contact with the outer peripheral surface of the sun shaft 3 before the outer periphery of the oil-containing roller 29 comes into contact with the inner peripheral surface of the stationary ring 2. This can prevent the oil-containing roller 29 from coming into contact with the stationary ring 2, and thus can prevent the oil-containing roller 29 from being caught between the stationary ring 2 and the corresponding planetary roller 4. The size of the first clearance C1a is not limited to a particular size in the present invention, and is normally 1 millimeter or smaller, for example.

Movement of the support plate 44 in the axial direction is restricted by the motor shaft 43 and the planetary rollers 4. The sun shaft 3 is fixed to the motor shaft 43 by press-fitting, and thus rotates integrally with the motor shaft 43. Thus, the support plate 44 provided around the outer peripheral surface of the sun shaft 3 with the small first clearance C1a therebetween can come into contact with the outer peripheral surface of the sun shaft 3 and rotate relatively to the sun shaft 3 in conjunction with rotation of the sun shaft 3.

To the support shafts 28 of the support plate 44, the oil-containing rollers 29 are rotatably provided. Specifically, each support shaft 28 is inserted into a hole 29a formed in the center of the corresponding oil-containing roller 29, whereby the oil-containing roller 29 is rotatably supported by the support shaft 28. Each oil-containing roller 29 is produced by mixing thermoplastic resin such as ultra-high molecular weight polyethylene, nylon, or polypropylene with lubricating oil having a high traction coefficient such as naphthenic mineral oil or silicone oil, heating this mixture up to a melting temperature of the resin, cooling the mixture for solidification, and forming the resulting solid in a cylindrical shape. Each oil-containing roller 29 is impregnated with the lubricating oil through small holes inside the oil-containing roller 29. The oil-containing roller 29 can be produced also by compression-molding synthetic resin powder and lubricant powder.

As depicted in FIG. 1, due to the revolution of the planetary rollers 4 about the axis O, the planetary rollers 4 come into contact with the oil-containing rollers 29. Accordingly, the support plate 44 depicted in FIG. 2 and FIG. 3 also rotates about the axis O. Thus, the support plate 44 rotates relatively to the sun shaft 3, the rotational speed of which is different from that of the planetary rollers 4, while being in contact with the sun shaft 3. As depicted in FIG. 1, each oil-containing roller 29 is continuously in contact with one of the planetary rollers 4 disposed on both sides of the oil-containing roller in the circumferential direction. This enables oil to be reliably supplied to the corresponding planetary rollers 4. Accordingly, oil can be stably supplied to rolling contact surfaces between the planetary rollers 4 and the stationary ring 2, and thus seizure of the rolling contact surfaces due to lack of oil can be prevented. Consequently, the lifespan of the power transmission device 1 can be increased.

As depicted in FIG. 3, each support shaft 28 of the support plate 44 is disposed such that the axis X thereof is slightly inclined with respect to the axis O of the stationary ring 2 instead of being parallel to the axis O. Specifically, the axis X of each support shaft 28 is inclined inward in the radial direction of the stationary ring 2 such that a distal end side (left side in FIG. 3) of the support shaft 28 is closer to the axis O of the stationary ring 2 than a base end side (right side in FIG. 3) thereof. In other words, a distance r1 from the center of the support shaft 28 at a distal end surface 28a to the axis O and a distance r2 from the center of the support shaft 28 at a base end surface 28b to the axis O have a relation of r1<r2. For example, the difference between the distance r1 and the distance r2 is set to about 0.01 millimeter to 0.5 millimeter. As depicted in FIG. 4, a pitch circle diameter D1 of the support shafts 28 at the distal end surfaces 28a is set to a smaller dimension than a pitch circle diameter D2 of the support shafts at the base end surfaces 28b. In other words, these pitch circle diameters are set so as to satisfy D1<D2.

As described above, the axis X of each support shaft 28 is inclined inward in the radial direction of the stationary ring 2 such that the distal end side of the support shaft 28 is closer to the axis O of the stationary ring 2 than the base end side thereof. Due to this inclination and contact of the corresponding oil-containing roller 29 with the corresponding planetary roller 4, a force acts on the oil-containing roller 29 toward the base end side of the support shaft 28. In addition, due to centrifugal force associated with the rotation of the support plate 44, a force acts on the oil-containing roller 29 toward the base end side of the support shaft 28. Thus, the oil-containing roller 29 is less likely to be detached from the support shaft 28.

The oil-containing roller 29 is less likely to be detached from the support shaft 28. Thus, even if the oil-containing roller 29 has worn and the outside diameter thereof has become smaller, the oil-containing roller 29 will not come into contact with an inner periphery of the loose rib 10, and the oil-containing roller 29 will not be caught between the loose rib 10 and the planetary roller 4. Consequently, the oil-containing roller 29 can be prevented from applying resistance to the rotation of the carrier 5.

Figure 5A:
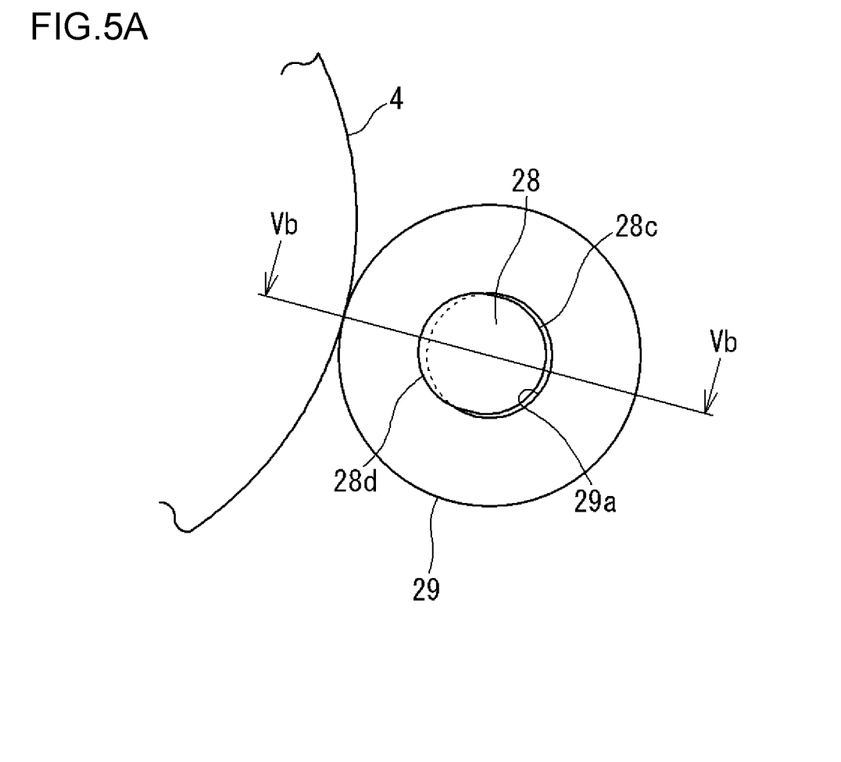
FIG. 5A is a front view illustrating an area of contact between a planetary roller and an oil-containing roller in an enlarged manner.
Figure 5B:
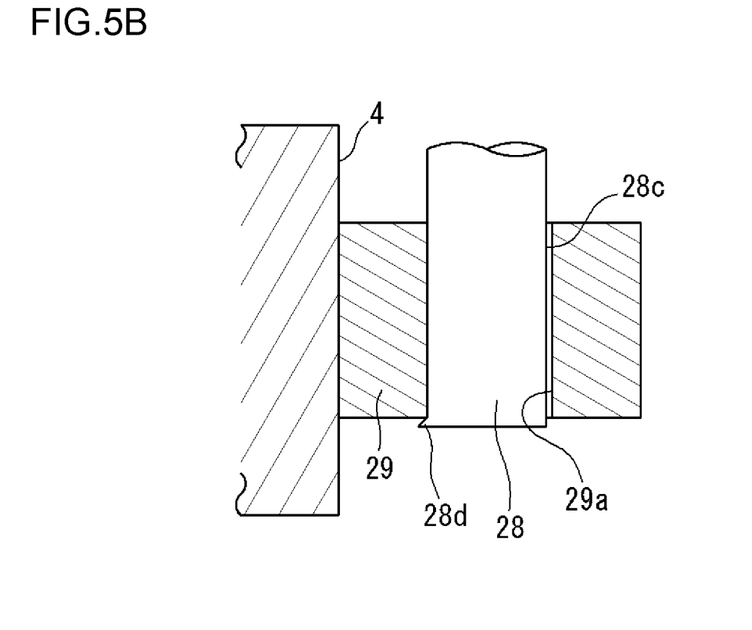
FIG. 5B is a sectional view taken along line Vb-Vb in FIG. 5A.

FIG. 5A is a front view illustrating an area of contact between a planetary roller 4 and an oil-containing roller 29 in an enlarged manner. FIG. 5B is a sectional view taken along line Vb-Vb in FIG. 5A. The outside diameter of the support shaft 28 is slightly smaller than the bore diameter of the hole 29a of the oil-containing roller 29. A very small clearance is formed between an outer peripheral surface 28c of the support shaft 28 and an inner surface of the hole 29a of the oil-containing roller 29. On part of an outer periphery of a distal end portion of the support shaft 28, a claw portion 28d that protrudes radially outward of the support shaft 28 is formed.

When the oil-containing roller 29 comes into contact with the planetary roller 4, the support shaft 28 is positioned close to one side portion of (close to the planetary roller 4 in) the hole 29a of the oil-containing roller 29 in an off-center manner. In view of such positioning of the support shaft 28, the claw portion 28d is formed to protrude in a direction in which the oil-containing roller 29 comes into contact with the planetary roller 4. Thus, even if the oil-containing roller 29 tends to move toward the distal end side of the support shaft 28, the claw portion 28d engages with the oil-containing roller 29, thereby reliably preventing the oil-containing roller 29 from being detached from the support shaft 28.

The claw portion 28d is formed on part of the outer periphery of the distal end portion of the support shaft 28, instead of being formed on the entire outer periphery. Thus, operation of inserting the support shaft 28 into the hole 29a of the oil-containing roller 29 to attach the oil-containing roller 29 to the support shaft 28 can be easily performed.

Figure 6:
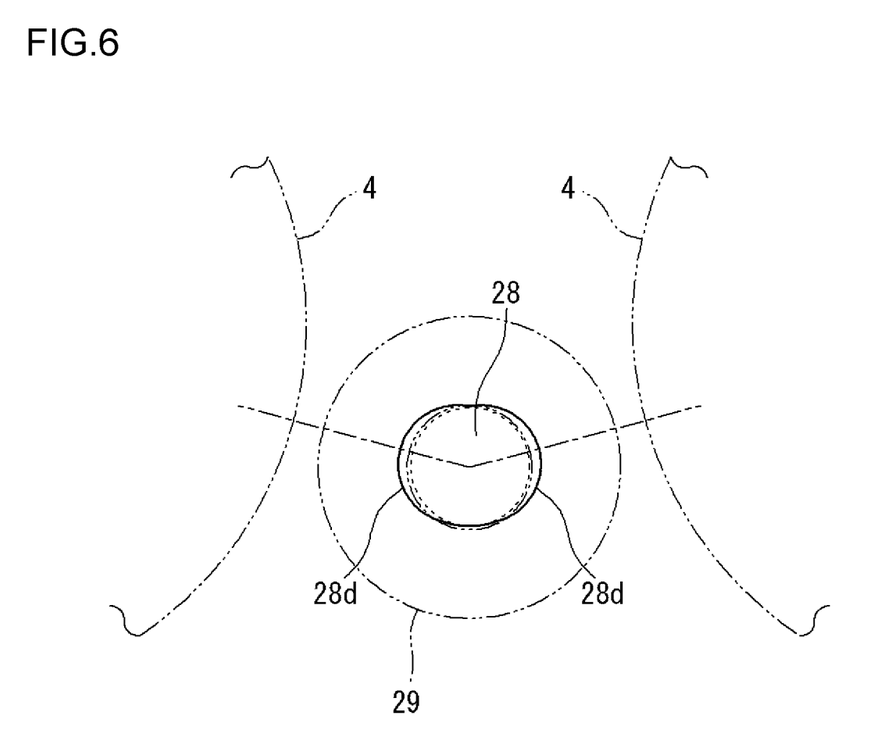
FIG. 6 is a front view illustrating a support shaft of a support plate in another embodiment of the present invention.

FIG. 6 is a front view illustrating a support shaft 28 of a support plate 44 in another embodiment of the present invention. In this embodiment, two claw portions 28d are formed on an outer periphery of a distal end portion of the support shaft 28 so as to protrude toward adjacent planetary rollers 4 on both sides. Thus, even if the oil-containing roller 29 comes into contact with either of the planetary rollers 4 depending on the rotational direction of the motor, either claw portion 28d can be engaged with the oil-containing roller 29, whereby the oil-containing roller 29 can be reliably prevented from being detached from the support shaft 28.

The present invention is not limited to the embodiments described above, and various modifications can be made within the scope of the claims. For example, in the embodiments described above, three planetary rollers are disposed around the sun shaft. However, the number of planetary rollers is not limited to a particular number in the present invention, and a different number of (e.g., four) planetary rollers may be disposed around the sun shaft and the number of oil-containing rollers may be changed depending on this number of the planetary rollers.

With the planetary roller power transmission device of the present invention, the oil-containing rollers can be prevented from being detached from the support shafts.

What is claimed is:

1. A planetary roller power transmission device comprising:
   a stationary ring;
   a sun shaft disposed radially inside the stationary ring so as to be concentric with an axis of the stationary ring;
   a plurality of planetary rollers provided between the stationary ring and the sun shaft so as to be pressed against the stationary ring and the sun shaft;
   a carrier that supports the planetary rollers so that the planetary rollers are rotatable and that rotates in conjunction with revolution of the planetary rollers;
   an oil-containing roller configured to be in contact with an outer peripheral surface of each of the planetary rollers; and
   a support body having a support shaft that is formed to protrude toward one side in an axial direction of the stationary ring in a cantilevered manner and rotatably supports the oil-containing roller, wherein
   an axis of the support shaft is inclined such that a distal end side of the support shaft is closer to the axis of the stationary ring than a base end side of the support shaft is.

2. The planetary roller power transmission device according to claim 1, wherein a claw portion protruding radially outward of the support shaft is formed on part of an outer periphery of a distal end portion of the support shaft.

3. The planetary roller power transmission device according to claim 2, wherein the claw portion protrudes in a direction in which the oil-containing roller comes into contact with the planetary rollers.

* * * * *